United States Patent [19]
Schlager et al.

[11] Patent Number: 5,661,383
[45] Date of Patent: Aug. 26, 1997

[54] CONTROL OF SLEW RATE DURING TURN-ON OF MOTOR DRIVER TRANSISTORS

[75] Inventors: Karl M. Schlager, Campbell; Massimiliano Brambilla, San Jose, both of Calif.

[73] Assignee: SGS-THOMSON Microelectronics, Inc., Carrollton, Tex.

[21] Appl. No.: 315,766

[22] Filed: Sep. 30, 1994

[51] Int. Cl.⁶ .................................................. H01R 39/46
[52] U.S. Cl. .................. 318/439; 318/254; 318/138; 323/315
[58] Field of Search ...................... 318/439, 254, 318/138; 323/315, 316, 317; 307/112

[56] References Cited

U.S. PATENT DOCUMENTS

| 4,274,014 | 6/1981 | Schade, Jr. ............... 307/112 X |
| 4,429,270 | 1/1984 | Davies et al. ............. 323/317 |
| 4,527,102 | 7/1985 | Gotou ...................... 318/254 |
| 5,191,269 | 3/1993 | Carobolante ............... 318/254 |
| 5,477,489 | 12/1995 | Wiedmann ................ 323/315 X |

*Primary Examiner*—Karen Masih
*Attorney, Agent, or Firm*—David V. Carlson; Theodore E. Galanthay; Lisa K. Jorgenson

[57] ABSTRACT

A circuit for controlling the slew rate at a motor coil during turn-on in a commutation sequence is disclosed. The disclosed circuit includes a switched current mirror that receives the commutation signal, and that provides a mirrored current to the input of an integrating buffer amplifier when its associated coil is to be driven. The integrating buffer amplifier includes an amplifier with a feedback capacitor, and a current source connected at its input, for reducing the voltage slew rate during turn-off of the transistor. The mirrored current applied to the input of the integrating buffer amplifier is greater than that of the current source, but limited so as to reduce the voltage slew at the coil.

17 Claims, 3 Drawing Sheets

CONTROL OF SLEW RATE DURING TURN-ON OF MOTOR DRIVER TRANSISTORS

This invention is in the field of motor control, and is more particularly directed to control of drive signals applied to motors.

BACKGROUND OF THE INVENTION

Modern polyphase DC motors have become commonplace in precision equipment such as hard disk drives of modern personal computer and workstation equipment, where the requirements of positional accuracy and operational speed are quite stringent. As a result, control circuitry for such motors has become quite sophisticated in ensuring rapid and uniform drive of the disk drive motors. "Glitches" and other nonlinearities such as torque ripple are highly undesirable in the drive of these motors, as they reduce motor performance, increase undesired acoustical noise, and increase the rate of motor wear.

Conventional polyphase DC motors are powered by the application of current to one or more selected stator coils of the motor according to a predetermined sequence to produce a varying magnetic field that rotates a permanent magnet rotor. The sequence in which the current is applied to the stator coils is generally referred to as the commutation sequence, as the drive current is commutated among the various stator coils in the sequence. This commutation produces electrical transients, however, as a result of the inductive nature of the stator coils; these transient effects are manifest in non-uniformity (i.e., "ripple") in the torque applied to the motor, and also in electromagnetic interference ("EMI") generated by the commutation.

Various techniques have previously been used to reduce the electrical transients from commutation, and thus reduce torque ripple and EMI. One such technique is described in U.S. Pat. No. 5,191,269, issued Mar. 2, 1993, assigned to SGS-Thomson Microelectronics, Inc. and incorporated herein by this reference. In this technique, a current integrator is used to control the gates of field-effect drive transistors in such a manner as to reduce the slew rate, or time rate of change of voltage, at the stator coil when the drive transistor for that coil is turned off.

Referring now to FIG. 1, the motor drive circuitry in this prior arrangement will now be described in detail. Motor 10 includes stator coils 4A, 4B, 4C, through which current is driven in operation of the motor to turn the rotor (not shown). Each of stator coils 4A, 4B, 4C is connected to the drain of a corresponding field-effect drive transistor 8A, 8B, 8C, respectively, at nodes A, B, C. In this example, center tap CT of motor 10 is biased to $V_{cc}$ through transistor 9 (while line UNI is maintained high), and as such drive transistors 8A, 8B, 8C are "low-side" drivers, as they control the current conducted to ground through its corresponding stator coil 4A, 4B, 4C. The sources of each of drive transistors 8A, 8B, 8C are connected in common to one end of a sense resistor 6, which has its other end connected to ground.

The gates of drive transistors 8A, 8B, 8C in this prior arrangement are driven by a buffer amplifier 12A, 12B, 12C under control of an error amplifier 2 that is implemented, in this example, as an operational transconductance amplifier (OTA). The output of error amplifier 2 is connected to switches 5A, 5B, 5C, each of which are connected to the input of its corresponding respective buffer amplifier 12A, 12B, 12C. Switches 5A, 5B, 5C are controlled by a conventional commutation sequencer circuit (not shown) which produces an active signal on lines SWA, SWB, SWC, respectively, according to the desired commutation sequence. Error amplifier 2 receives a command signal on line IN, and a feedback signal on line FB from the top end of sense resistor 6, and produces an output current proportional to the differential voltage between the command signal on line IN and the sensed voltage on line FB (which corresponds to the sum of the drive currents through coils 4A, 4B, 4C). In this way, error amplifier 2 controls the drive of motor 10 according to an external control signal, with the balanced condition being that the feedback voltage on line FB, corresponding to drive current sensed by sense resistor 6, equals that commanded by the signal on line IN.

In operation, if stator coil 4A is to conduct current in a specific commutation phase, for example, line SWA will be driven high by the commutation sequencer, and lines SWB, SWC will be driven low. The output of error amplifier 2, indicating the amount of drive current to be driven to the selected stator coil 4, will then be applied to the input of buffer amplifier 12A, which in turn turns on low side drive transistor 8A to the extent indicated by error amplifier 2. Current will then be conducted from $V_{cc}$ through transistor 9, center tap CT and coil 4A to the extent allowed by drive transistor 8A. If the next commutation phase requires stator coil 4B to conduct rather than stator coil 4A, line SWB will be driven high and line SWA (and line SWC) will be driven low, turning on transistor 8B and turning off transistor 8A, thus conducting current through stator coil 4B rather than stator coil 4A. The sequence continues in the same manner, with stator coil 4C next conducting, to rotate the motor at the desired speed indicated by the command signal on line IN.

While this example illustrates operation of motor 10 in a unipolar mode, motor 10 may also or instead be driven in the well-known bipolar mode, in which center tap CT will not be driven and in which high-side driver transistors will drive each of nodes A, B, C in sequence in combination with low-side driver transistors 8A, 8B, 8C. In this mode, two stator coils 4 will be driven in each commutation phase, to the extent controlled by one of the drive transistors (generally the low-side drive transistors 8), with one stator coil 4 sourcing current toward center tap CT and with the other stator coil 4 sinking current therefrom.

In the arrangement of FIG. 1, as described in the above-incorporated U.S. Pat. No. 5,191,269, a current integrating function is provided to reduce voltage transients at nodes A, B, C that result when the corresponding respective drive transistor 8A, 8B, 8C is turned off in commutation. These transients result from the inability to instantaneously change the current through an inductor, such as through stator coils 4A, 4B, 4C. The current integrating is implemented by current sources 14A, 14B, 14C, each connected to the input of a corresponding respective buffer amplifier 12A, 12B, 12C, and by capacitors 7A, 7B, 7C connected between nodes A, B, and C, respectively, and the input to the corresponding buffer amplifier 12A, 12B, 12C, respectively. The effect of current sources 14 and capacitors 7 is to limit the voltage slew rate at nodes A, B, C when the corresponding drive transistor 8 is turned off.

In brief, referring by way of example to node A, the voltage $V_A$ at node A will obey the following relationship when transistor 8A is turned off:

$$\frac{\Delta V_A}{\Delta t} = \frac{i_{14A}}{C_7}$$

where $i_{14A}$ is the current sourced by current source 14A, and where $C_7$ is the capacitance of capacitor 7A. Accordingly, the provision of current sources 14 and capacitors 7 serve well to reduce the voltage slew rate at stator coils 4 during commutation.

Relative to the arrangement of FIG. 1, it has been observed, however, that voltage transients still remain to some extent at those nodes for which the corresponding drive transistor is turning on. FIG. 2 illustrates the operation of the circuit of FIG. 1 at the commutation between stator coil 4A being driven to stator coil 4B being driven. At time $t_0$, the voltage $V_A$ at node A is low, the voltage $V_B$ at node B is high, the current $I_A$ through stator coil $4_A$ is at a high level and the current $I_B$ through stator coil $4_B$ is zero, given that transistor 8A is on and transistor 8B is off. The operation of sense resistor 6 with error amplifier 2 means that the drive currents are controlled so that the sum of the coil currents $i_A$, $i_B$, $i_C$ is constant ($i_C$ being zero in this example of commutation from coil 4A to coil 4B).

At time $t_1$, line SWA goes low and line SWB goes high, to turn off transistor 8A and turn on transistor 8B. Because of the reduced slew rate provided by current source 14A and capacitor 7A noted above, the voltage $V_A$ slowly ramps up toward its eventual high voltage, at a rate corresponding to the ratio $i_{14A}/C_7$, as noted above; qualitatively, the instantaneous current through stator coil 4A is absorbed by capacitor 7A in such a way as to prevent a positive-going voltage spike at node A at $t_1$.

However, since the current $I_B$ through stator coil 4B at time $t_0$ is zero, and since this current cannot instantaneously change at time $t_1$, transistor 8B will not be conducting current at such time as it is turned on at time $t_1$. In addition, the current provided at the output of error amplifier 2 is also quite large, and is substantially absorbed by capacitor 7B when switch 5B is turned on at time $t_1$. These events result in the drain voltage of transistor 8B immediately collapsing low due to the lack of drain-to-source current and to the rapid charging of capacitor 7B. This rapid transient results in significant ringing of the voltage $V_B$ at node B, as shown in FIG. 2, and thus in a significant amount of undesired electromagnetic interference (EMI).

It is therefore an object of the present invention to provide a circuit and method for reducing the turn-on transients in the commutation of a polyphase DC motor.

It is a further object of the present invention to accomplish these results by limiting the voltage slew rate at the coils during turn-on.

It is a further object of the present invention to provide such circuitry which presents a relatively low input impedance to the error amplifier after the period of limited voltage slew rate in a commutation phase.

Other objects and advantages of the present invention will be apparent to those of ordinary skill in the art having reference to the following specification together with its drawings.

SUMMARY OF THE INVENTION

The present invention may be implemented by way of a current mirror at the input to the current integrating driver of drive transistors in a motor control circuit for a polyphase DC motor. The current mirror includes a switching current source in its primary leg, so as to limit the amount of current that is applied by the secondary current mirror leg to the input of the integrating capacitor, which limits the voltage slew rate at the coil node when the drive transistor is turned on. The current mirror also serves to present a low input impedance to the error amplifier after the initial transient period has passed.

DETAILED DESCRIPTION OF THE PREFERRED EMBODIMENT

Figure 3:
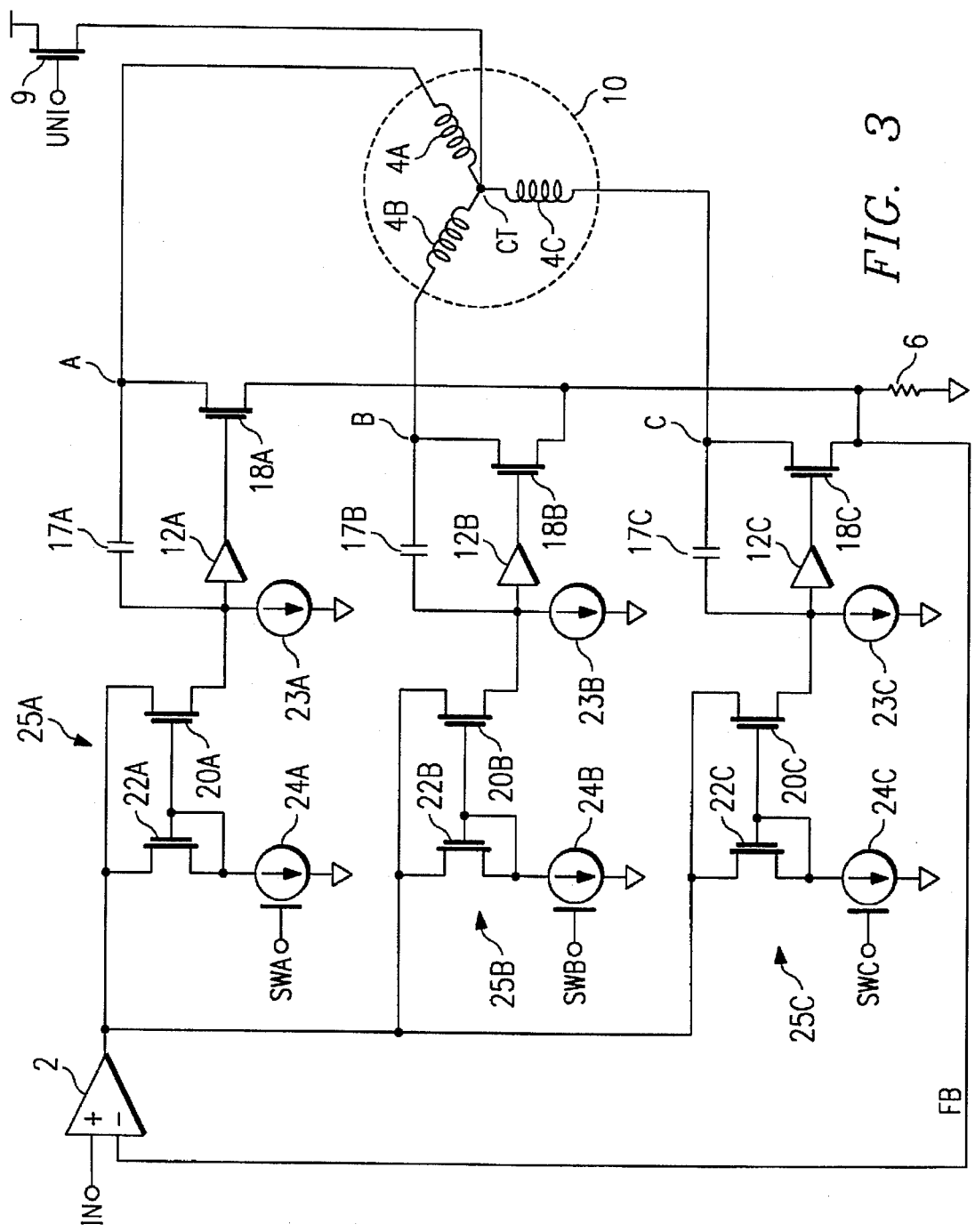
FIG. 3 is an electrical diagram, in schematic form, of a driver circuit for a polyphase DC motor according to the preferred embodiment of the invention.

Referring now to FIG. 3, a driver circuit for a polyphase DC motor according to the present invention will now be described in detail. This embodiment of the invention is directed to a three-phase DC motor configured in the well-known "Y" configuration, and which is driven by commutation of low-side drive transistors according to the well-known unipolar mode arrangement. It will be appreciated by those of ordinary skill in the art that other motor arrangements, including motors having more than three phases can also benefit from the present invention. In addition, as is well known in the art, polyphase DC motors are also operated in a bipolar mode in which two coils are driven, and thus in which both high-side and low-side drivers are provided for each coil; indeed, many motors can be driven in either mode, such as in a bipolar mode on startup and a unipolar mode after reaching a certain speed. It is contemplated that the present invention is also applicable to polyphase DC motors driven in bipolar mode, and that the present invention may be applied to control the high-side drive transistors instead of the low-side drive transistors as will be described hereinbelow. It is further contemplated that these and other alternative embodiments of the present invention will be apparent to those of ordinary skill in the art having reference to this specification and its drawings.

Figure 1:
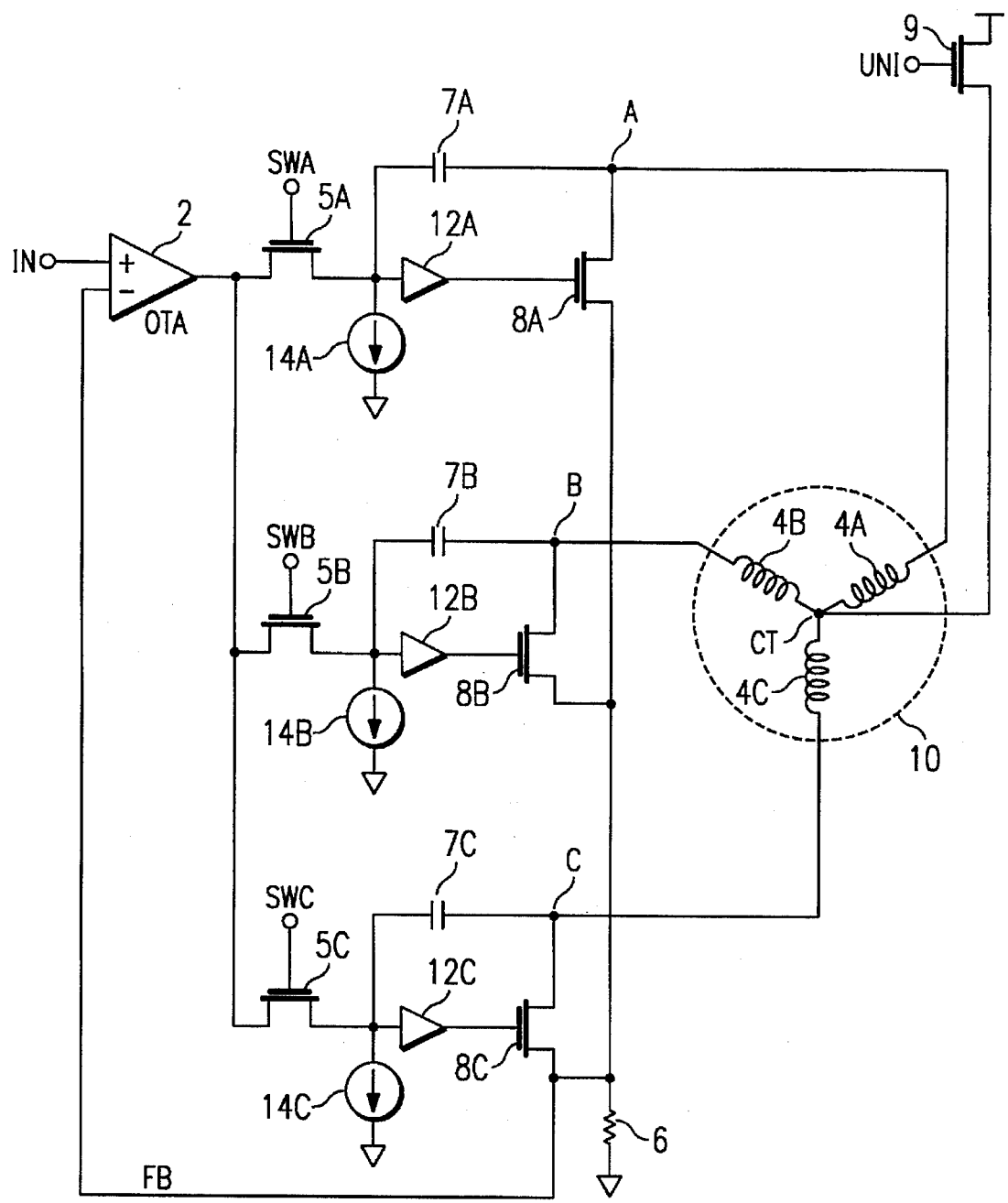
FIG. 1 is an electrical diagram, in schematic form, of a driver circuit for a polyphase DC motor according to the prior art.

In FIG. 1, motor 10 includes three stator coils 4A, 4B, 4C arranged in a "Y" configuration as in the case of FIG. 1. Transistor 9 connects center tap CT to a high voltage $V_{cc}$ while in unipolar mode, which is indicated by line UNI at a high level to turn on transistor 9. Each stator coil 4A, 4B, 4C is connected to the drain of n-channel field-effect low-side drive transistor 18A, 18B, 18C, respectively, at corresponding respective nodes A, B, C; transistors 18 may alternatively be implemented as bipolar transistors, p-channel transistors, or the like. Sense resistor 6 is connected between ground and the commonly-connected sources of drive transistors 18A, 18B, 18C, to provide a feedback voltage on line FB corresponding to the sum of the drive currents through coils 4A, 4B, 4C.

Alternatively, sensing of the drive current through coils 4A, 4B, 4C for purposes of providing feedback control may be done by other techniques. For example, copending application Ser. No. 08/315,924, filed Sep. 30, 1994, entitled "Improved Current Sensing and Control in Brushless DC Motors" (Attorney's Docket No. 94-S-008), assigned to SGS-Thomson Microelectronics, Inc. and incorporated herein by this reference, describes a current mirror sensing technique for sensing the drive current both in bipolar and unipolar drive modes.

Similarly as described hereinabove relative to FIG. 1, the gates of drive transistors 18A, 18B, 18C in this prior arrangement are driven by a buffer amplifier 22A, 22B, 22C. Detailed construction of an example of buffer amplifier 22 is described in the above-incorporated U.S. Pat. No. 5,191, 269. As described therein and also hereinabove, a current integrating function is implemented by current sources 23A, 23B, 23C, each connected to the input of its respective buffer amplifier 22A, 22B, 22C, and by capacitors 17A, 17B, 17C connected between drive nodes A, B, C, respectively, and the input to the corresponding respective buffer amplifier 22A, 22B, 22C. As described above, current sources 23 and capacitors 17 limit the voltage slew rate at nodes A, B, C when the corresponding drive transistor 18 is turned off.

The motor driver of FIG. 3 also includes error amplifier 2, which receives a command signal from line IN at its non-inverting input, and the feedback voltage on line FB at its inverting input. According to this embodiment of the invention, the output of error amplifier 2 is applied to each of current mirrors 25A, 25B, 25C, associated with stator coils 4A, 4B, 4C, respectively.

Each current mirror 25 is constructed of a pair of n-channel field effect transistors 20, 22 having their drains connected to the output of error amplifier 2 and having their gates connected in common to the source of transistor 22. Transistors 20, 22 preferably match one another in size (i.e., ratio of channel width to channel length) so that their drive characteristics are substantially equal and so that they conduct equal current by virtue of the current mirror arrangement; alternatively, the relative sizes of transistors 20, 22 may be selected to conduct a ratioed current relative to one another. The source of transistor 22 in each of current mirrors 25 is connected to a switched current source 24 which, when operating, sinks a specified current to ground. Current sources 24A, 24B, 24C in current mirrors 25A, 25B, 25C, respectively, are controlled by commutation signal applied to lines SWA, SWB, SWC, respectively, which are generated by a commutation sequencer (not shown) in the conventional manner. Each of switched current sources 24 are preferably implemented by way of a field-effect transistor biased to the appropriate point as to provide a fixed current upon its gate being energized to a high logic level; it is contemplated that such construction will be readily apparent to one of ordinary skill in the art. The current sourced by each current source 24 in this example is preferably larger than that sourced by each current source 23. In this example, each of current sources 24A, 24B, 24C conduct no current when its respective input line SWA, SWB, SWC is low, and conducts a fixed current when its respective input line SWA, SWB, SWC is at a high logic level. The source of transistors 20A, 20B, 20C are connected to the input of buffer amplifiers 22A, 22B, 22C, respectively.

In operation, error amplifier 2 receives a command signal on line IN and a feedback signal on line FB from the top end of sense resistor 6, and produces an output proportional to the differential voltage between the command signal on line IN and the sensed voltage on line FB corresponding to the sum of the drive currents through coils 4A, 4B, 4C. This output from error amplifier 2 is applied to the drains of each of transistors 20, 22 in each of current mirrors 25A, 25B, 25C. The current sources 24A, 24B, 24C for those of current mirrors 25A, 25B, 25C having low corresponding input lines SWA, SWB, SWC are turned off as noted above. When a current source 24 is turned off, its transistor 20 will apply no current to the input of the corresponding buffer amplifier 22, and the corresponding drive transistors 18 will thus be turned off.

However, the one of current mirrors 25A, 25B, 25C receiving a high level on its corresponding input line SWA, SWB, SWC will have its current source 24A, 24B, 24C turned on. By way of example, if line SWA is high and lines SWB, SWC are low, transistors 20B, 20C will not be applying current to buffer amplifiers 22B, 22C and thus transistors 18B, 18C will be turned off. However, with line SWA high, current source 24A will be conducting a fixed current through transistor 22A, and this fixed current will be mirrored by transistor 20A and applied to the input of buffer amplifier 12A. Accordingly, buffer amplifier 22A will be turned on by the excess current from transistor 20A, and will turn on transistor 18A so that current is conducted by stator coil 4A in motor 10. The extent to which transistor 18A is turned on will be determined by the extent of the drive applied by error amplifier 2 based on a comparison of the feedback voltage on line FB with the command input on line IN, as before.

Figure 4:
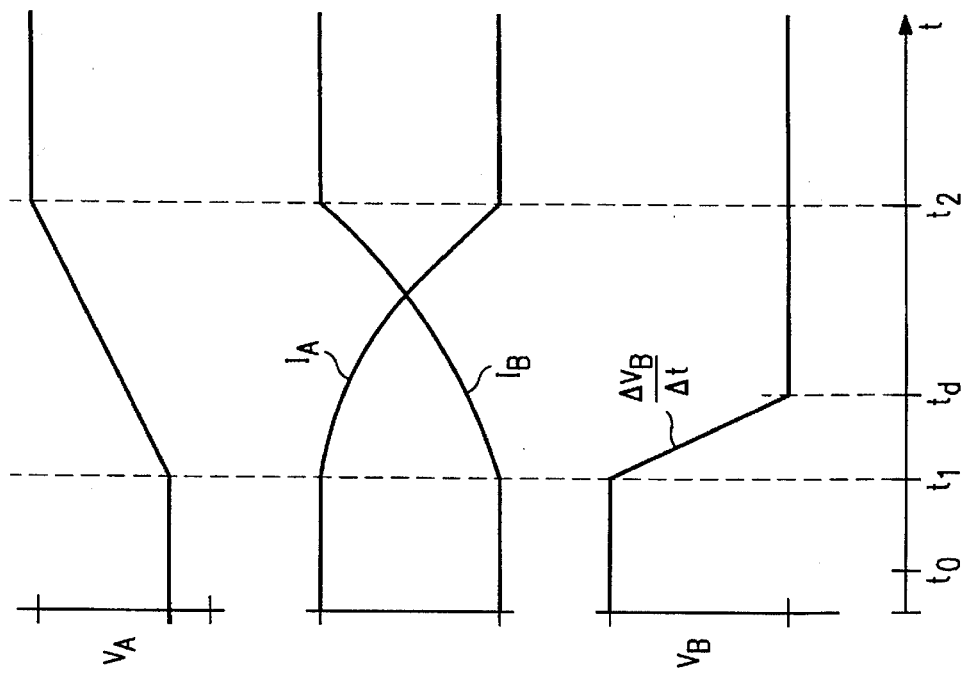
FIG. 4 is a timing diagram illustrating the operation of the circuit of FIG. 3.

Referring now to FIG. 4, for example, the above-described condition where stator coil 4A is conducting current and stator coils 4B, 4C are not, is illustrated at time $t_0$. As the example of commutation illustrated in FIG. 4 is the switching of current from coil 4A to coil 4B, the voltage and current relative to coil 4C will not be illustrated; of course, operation of the circuit of FIG. 3 for the other commutations in the sequence will be equivalent. At this point in time, transistor 18A is on and transistors 18B, 18C are off; as such, the current $I_A$ through coil 4A is at a high level and the current $I_B$ through coil 4B is zero, and the voltage $V_A$ at node A is low and the voltage $V_B$ at node B is high.

At time $t_1$ in the example of FIG. 4, a commutation from the phase in which coil 4A conducts to the phase in which coil 4B conducts is initiated by line SWA returning low and line SWB going to a high logic level (line SWC remaining low). With line SWA going low, the current through transistors 20A, 22A goes to zero, removing current from the input of buffer amplifier 12A, turning off low side drive transistor 18A. As described hereinabove, the integrating function implemented by capacitor 17A reduces the voltage slew rate at node A to the following:

$$\frac{\Delta V_A}{\Delta t} = \frac{i_{23A}}{C_{17}}$$

where $i_{23A}$ is the current sourced by current source 23A, and where $C_{17}$ is the capacitance of capacitor 17A.

Also at time $t_1$, with line SWB going high to turn on current mirror 24B, current begins to be applied from the output of error amplifier 2 to the input of buffer amplifier 12B via transistor 20B. Because of current mirror 25B, however, the current through transistor 20B is limited to the current sourced by current source 24B, in this example where the size of transistor 22B matches that of transistor 20B (if transistors 20B, 22B are of different sizes, of course, the ratio of the currents therethrough will behave accordingly). This current (e.g., on the order of 15 μA) is much reduced from that which would otherwise have been applied to the input of buffer amplifier 12B by a typical error amplifier 2. Accordingly, the current applied to the input of buffer amplifier 12B is limited immediately upon the switching at time $t_1$ to the current $i_{24B}$ of current source 24B less the current $i_{23B}$ of current source 23B. By rudimentary operational amplifier analysis methods, the time rate of change of voltage $V_B$ at node B therefore follows the relationship:

$$\frac{\Delta V_B}{\Delta t} = \frac{i_{214B} - i_{23B}}{C_{17B}}$$

where $i_{23B}$ is the current sourced by current source 23B, where $i_{24B}$ is the current sourced by current source 24B, and where $C_{17B}$ is the capacitance value of capacitor 17. The slope of this voltage slew is qualitatively illustrated in FIG. 4 relative to the voltage $V_B$, with the voltage $V_B$ reaching its low level at time $t_d$. At time $t_2$, the commutation is complete, with current $I_A$ through coil 4A reaching zero and the current $I_B$ through coil 4B reaching the driven level determined by error amplifier 2.

After time $t_d$, capacitor 17B will be fully charged by the current from mirror transistor 20B. Buffer amplifier 12B will then operate in a voltage control mode, so that its output will follow the voltage at the output of error amplifier 2.

Figure 2:
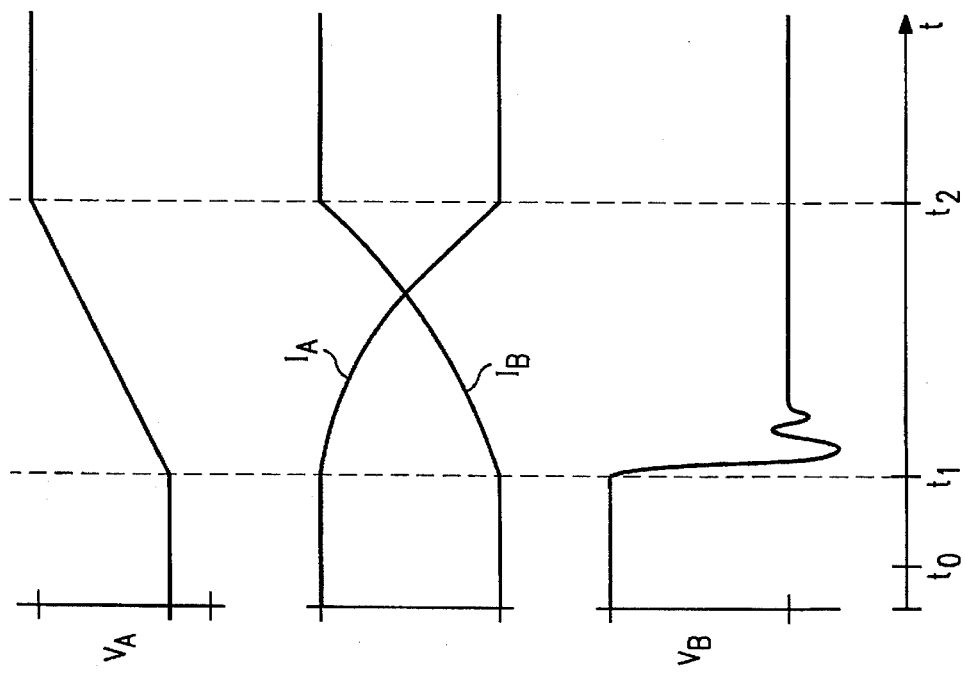
FIG. 2 is a timing diagram illustrating the operation of the circuit of FIG. 1.

By way of example, exemplary values for the various parameters in the circuit of FIG. 3 may have the current $I_{23}$ (for each of current sources 23A, 23B, 23C) on the order of 5 μA, the current $I_{24}$ (for each of current sources 24A, 24B, 24C) may be on the order of 15 μA, and the capacitance value $C_{17}$ (for each of capacitors 17A, 17B, 17C) may be on the order of 20 pF. Accordingly, for these parameter values, the turn-off slew rate will be approximately 0.25 volts/μsec and the turn-on slew rate would be approximately 0.5 volts/μsec. These slew rates are believed to provide adequate noise performance while still providing high performance motor operation. The electromagnetic interference (EMI) generated by the turning on of driver transistors according to the present invention is therefore much reduced, as is apparent from a comparison of FIG. 4 to FIG. 2.

In addition to the reduced EMI, the present invention also provides the important benefit that transistors 20 present a relatively low input impedance to the output of error amplifier 2, once the slew rate limiting function is complete (i.e., after time $t_d$ in FIG. 4). This low input impedance results from operation of the current mirrors 25, once capacitor 17 for the conducting coil is fully charged up. In this case, buffer amplifiers 12 will quickly respond to variations in the output current produced by error amplifier 2 in response to a differential between the feedback voltage and the command input.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A driver circuit for a polyphase DC motor, comprising:
   an error amplifier, for generating at an output a drive signal responsive to a command input signal and to a feedback signal;
   a plurality of coil drive circuits, each corresponding to a coil of the motor, each coil drive circuit comprising:
      a driver transistor having a conduction path connected to the corresponding coil, and having a control electrode;
      a buffer amplifier having an input, and having an output coupled to the control electrode of the driver transistor;
      a capacitor coupled between the input of the buffer amplifier and the conduction path of the driver transistor; and
      a first current source connected to the input of the buffer amplifier, for conducting a first current; and
   a plurality of switched current mirrors, each coupled to the output of the error amplifier and associated with one of the plurality of coil drive circuits, each switched current mirror comprising:
      a switched current source, having a control electrode for receiving a commutation signal, for conducting a second current;
      a primary transistor having its conduction path connected between the output of the error amplifier and the switched current source, and having a control electrode connected to one side of its conduction path; and
      a secondary transistor having its conduction path connected between the output of the error amplifier and the input to the buffer amplifier in the corresponding coil drive circuit, and having its control electrode connected to the control electrode of the primary transistor, for conducting a current mirroring the second current responsive to the switched current source receiving a commutation signal.

2. The driver circuit of claim 1, wherein the plurality of coil drive circuits are low side drivers for the motor.

3. The driver circuit of claim 1, wherein the driver transistors of the plurality of coil driver circuits are of the field-effect type.

4. The driver circuit of claim 1, wherein the primary and secondary transistors of the plurality of switched current mirrors are of the field-effect type.

5. The driver circuit of claim 1, wherein the second current is larger than the first current.

6. The driver circuit of claim 1, wherein the primary and secondary transistors of the plurality of switched current mirrors have substantially the same drive characteristics.

7. The driver circuit of claim 1, further comprising:
   a sense resistor, connected between the conduction paths of each of the plurality of driver transistors and a reference voltage;
   wherein the feedback signal corresponds to the voltage across the sense resistor.

8. A method of controlling a driver circuit driving a plurality of coils in a polyphase DC motor, comprising:
   sensing the drive current through the coils;
   comparing the sensed drive current to a command signal, and generating a drive signal responsive to the comparison; and
   for a first one of the plurality of coils to be driven in a first phase of a commutation sequence:
      turning on a switched current source in the primary leg of a first current mirror, so that the current of the switched current source is conducted by a secondary leg; and
      applying the current conducted by the secondary leg of the first current mirror to the input of a first integrating buffer amplifier circuit, said buffer amplifier circuit comprising a buffer amplifier, a capacitor connected between the input of the buffer amplifier, and the first one of the plurality of coils, and a buffer current source connected to the input of the buffer amplifier, wherein the output of the buffer amplifier is connected to the control electrode of a first drive transistor so that, responsive to the applying of current to the input of the first integrating buffer amplifier circuit, the first drive transistor conducts current through the first one of the plurality of coils.

9. The method of claim 8, further comprising the step of biasing a center tap of said polyphase DC motor to a supply voltage.

10. The method of claim 8, wherein the current conducted by the secondary leg of the first current mirror is greater than the current conducted by the buffer current source of the first integrating buffer amplifier circuit during said applying step.

11. The method of claim 8, further comprising:

for a second phase of the commutation sequence in which a second one of the plurality of coils is to be driven and in which the first one of the plurality of coils is to no longer be driven:
- turning off the switched current source in the primary leg of the first current mirror so that no current of is conducted by a secondary leg of the first current mirror, and so that the first drive transistor ceases conducting current through the first one of the plurality of coils;
- turning on a switched current source in the primary leg of a second current mirror, so that the current of the switched current source is conducted by a secondary leg; and
- applying the current conducted by the secondary leg of the second current mirror to the input of a second integrating buffer amplifier circuit, said second integrating buffer amplifier circuit comprising a buffer amplifier, a capacitor connected between the input of the buffer amplifier and the second one of the plurality of coils, and a buffer current source connected to the input of the buffer amplifier, wherein the output of the buffer amplifier is connected to the control electrode of a second drive transistor so that, responsive to the applying of current to the input of the second integrating buffer amplifier circuit, the second drive transistor conducts current through the second one of the plurality of coils.

12. A motor system, comprising:

a motor comprising a plurality of coils;

a driver circuit comprising:
- an error amplifier, for generating at an output a drive signal responsive to a command input signal and to a feedback signal;
- a plurality of coil drive circuits, each corresponding to one of the plurality of coils, each coil drive circuit comprising:
  - a driver transistor having a conduction path connected to the corresponding coil, and having a control electrode;
  - a buffer amplifier having an input, and having an output coupled to the control electrode of the driver transistor;
  - a capacitor coupled between the input of the buffer amplifier and the conduction path of the driver transistor; and
  - a first current source connected to the input of the buffer amplifier, for conducting a first current; and
- a plurality of switched current mirrors, each coupled to the output of the error amplifier and associated with one of the plurality of coil drive circuits, for applying a second mirror current, larger than the first current, to the input of the buffer amplifier responsive to receiving a commutation signal indicating that its associated one of the plurality of coil drive circuits is to drive its associated coil.

13. The system of claim 12, wherein each of the plurality of switched current mirrors comprises:
- a switched current source, having a control electrode for receiving a commutation signal, for conducting a second current;
- a primary transistor having its conduction path connected between the output of the error amplifier and the switched current source, and having a control electrode connected to one side of its conduction path; and
- a secondary transistor having its conduction path connected between the output of the error amplifier and the input to the buffer amplifier in the corresponding coil drive circuit, and having its control electrode connected to the control electrode of the primary transistor, for conducting a current mirroring the second current responsive to the switched current source receiving a commutation signal.

14. The system of claim 13, wherein the primary and secondary transistors of the plurality of switched current mirrors are of the field-effect type.

15. The system of claim 13, wherein the primary and secondary transistors of the plurality of switched current mirrors have substantially the same drive characteristics.

16. The system of claim 12, further comprising:
- a sense resistor, connected between the conduction paths of each of the plurality of driver transistors and a reference voltage;

wherein the feedback signal corresponds to the voltage across the sense resistor.

17. The system of claim 12 wherein the plurality of coils are arranged in a "Y" configuration having a center tap.

* * * * *